(12) United States Patent
Rivas et al.

(10) Patent No.: US 8,414,252 B2
(45) Date of Patent: Apr. 9, 2013

(54) METHOD AND APPARATUS FOR DOUBLE FLOW TURBINE FIRST STAGE COOLING

(75) Inventors: Flor Del Carmen Rivas, Clifton Park, NY (US); Howard Brilliant, Niskayuna, NY (US); Kenneth Michael Koza, Ballston Lake, NY (US); Vishwas Kumar Pandey, Karnataka (IN)

(73) Assignee: General Electric Company, Schenectady, NY (US)

( * ) Notice: Subject to any disclaimer, the term of this patent is extended or adjusted under 35 U.S.C. 154(b) by 752 days.

(21) Appl. No.: 12/651,535

(22) Filed: Jan. 4, 2010

(65) Prior Publication Data

US 2011/0164957 A1 Jul. 7, 2011

(51) Int. Cl.
*F01D 25/12* (2006.01)
(52) U.S. Cl.
USPC ............ 415/115; 415/199.5; 415/1; 415/220; 415/103
(58) Field of Classification Search .................. 415/115, 415/199.5, 1
See application file for complete search history.

(56) References Cited

U.S. PATENT DOCUMENTS

| | | | | |
|---|---|---|---|---|
| 3,817,654 A | * | 6/1974 | Sohma | 415/103 |
| 4,571,153 A | * | 2/1986 | Keller | 415/117 |
| 4,764,084 A | * | 8/1988 | Parker et al. | 415/101 |
| 5,249,918 A | * | 10/1993 | Knorowski | 415/108 |
| 5,575,620 A | | 11/1996 | Haller et al. | |
| 5,593,273 A | | 1/1997 | Brinkman | |
| 6,234,746 B1 | | 5/2001 | Schroder et al. | |
| 6,331,097 B1 | | 12/2001 | Jendrix | |
| 6,364,613 B1 | | 4/2002 | Deallenbach et al. | |
| 7,040,861 B2 | | 5/2006 | Clifford et al. | |
| 2007/0065273 A1 | | 3/2007 | Cornell | |
| 2009/0217673 A1 | | 9/2009 | Rivas et al. | |

* cited by examiner

*Primary Examiner* — Ninh H Nguyen
(74) *Attorney, Agent, or Firm* — Nixon & Vanderhye P.C.

(57) ABSTRACT

A cooling path is defined through a double-flow steam turbine. The steam turbine includes a generator end and a turbine end and a double-flow tub diaphragm disposed axially between the generator end and the turbine end. A first stage of the steam turbine includes a plurality of first stage nozzles and a plurality of first stage buckets, and a steam path is defined from an inlet region, through the turbine end, to a steam outlet. The cooling path includes cooling holes in the tub diaphragm and root radial seals permitting steam flow beneath the tub diaphragm and around the first stage nozzles and back into the steam path before the first stage buckets.

10 Claims, 2 Drawing Sheets

METHOD AND APPARATUS FOR DOUBLE FLOW TURBINE FIRST STAGE COOLING

BACKGROUND OF THE INVENTION

The invention relates to steam turbines and, more particularly, to cooling a tub region of a double-flow steam turbine.

Double-flow steam turbines typically include two parallel flow turbine ends arranged on a common shaft. A tub section is often located between the turbine ends and disposed around the shaft. Steam flows into the steam turbine radially inwardly toward the tub section, and the steam flow then divides, turns axially, and flows in opposing directions to enter each of the two parallel flow turbine ends.

Steam flow may become stagnant between the rotor and the tub section of the double-flow steam turbine resulting in a high temperature on the rotor due to windage heating of the stagnant steam. That is, the area in which steam flow is stagnant may have an increased temperature as compared to the temperature in other areas of the turbine. Achieving a steady state temperature facilitates avoidance of component failure. High rotor temperature potentially shortens the useful life of the rotor and may lead to failure of the steam turbine.

BRIEF DESCRIPTION OF THE INVENTION

In an exemplary embodiment, a cooling path is defined through a double-flow steam turbine. The steam turbine includes a generator end and a turbine end and a double-flow tub diaphragm disposed axially between the generator end and the turbine end. A first stage of the steam turbine includes a plurality of first stage nozzles and a plurality of first stage buckets, and a steam path is defined from an inlet region, through the turbine end, to a steam outlet. The cooling path includes cooling holes in the tub diaphragm permitting steam flow beneath the tub diaphragm and around the first stage nozzles and back into the steam path before the first stage buckets.

In another exemplary embodiment, a steam turbine includes the cooling path with cooling holes in the tub diaphragm and root radial seals permitting steam flow beneath the tub diaphragm and around the first stage nozzles and back into the steam path before the first stage buckets.

In still another exemplary embodiment, a method of cooling a double-flow steam turbine comprises directing steam flow below the tub diaphragm for positive cooling of the blade dovetails without bypassing the first stage buckets.

DETAILED DESCRIPTION OF THE INVENTION

Figure 1:
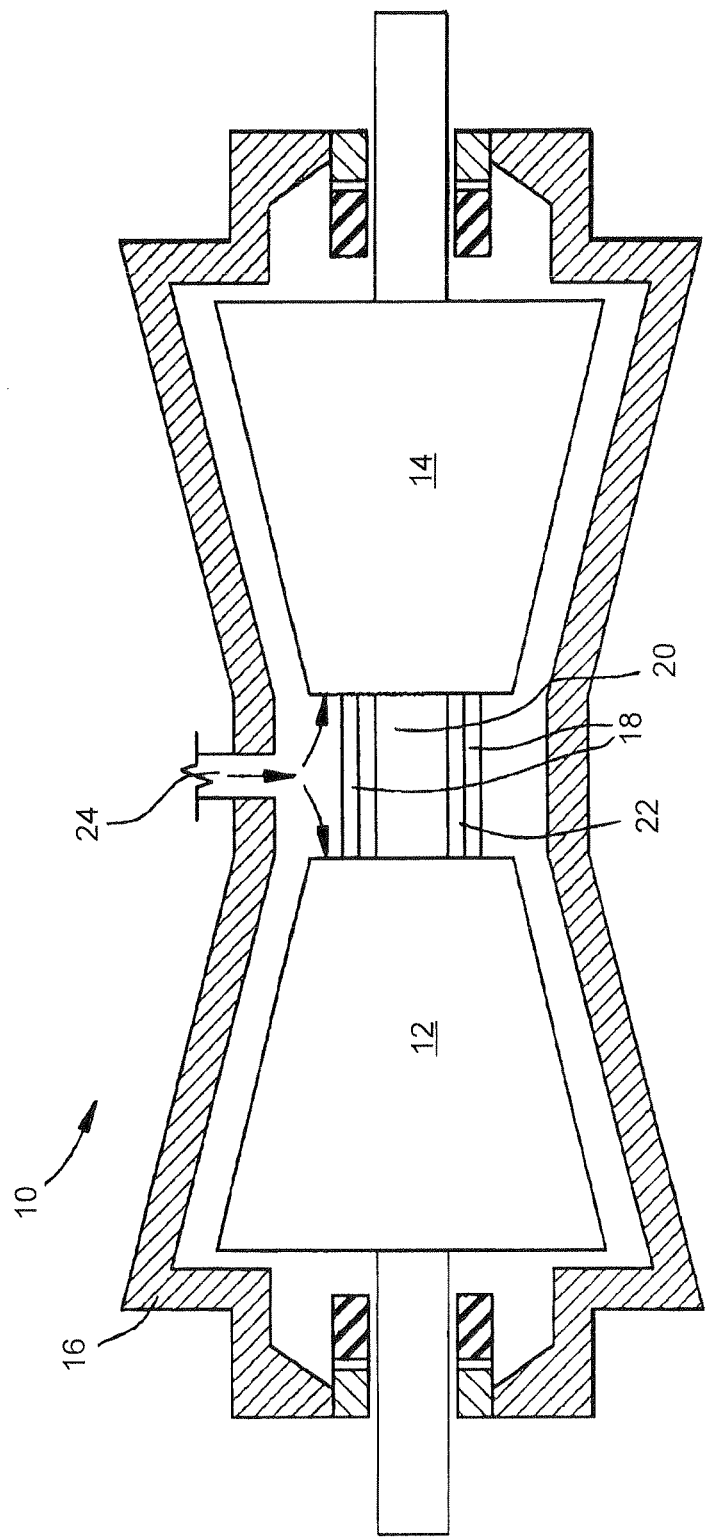
FIG. 1 is a schematic illustration of an exemplary opposed flow, or double flow, steam turbine.

FIG. 1 is a schematic representation of a double-flow steam turbine 10. Although the invention is described in the context of its use in a double-flow steam turbine, the described embodiments will also work for a single flow machine.

Steam turbine 10 includes a generator end 12 disposed nearest to a generator (not shown) and a turbine end 14 disposed farthest from the generator, and the generator end 12 and turbine end 14 may be disposed in an outer case 16. A double flow tub section or tub diaphragm 18 is disposed axially between the generator end 12 and the turbine end 14 and radially outboard of a rotor 20. The rotor 20 may comprise, for example, a drum rotor or at least one rotor disk disposed on a rotor shaft. The rotor 20 and the tub section 18 are configured and disposed to define an annulus 22 between the rotor 20 and the tub section 18.

Steam enters the steam turbine 10 at an inlet 24, which is disposed radially outboard of the rotor 20 and the tub section 18. Steam entering the steam turbine 10 at the inlet 24 flows toward the tub section 18, divides, and then enters either of the generator end 12 or the turbine end 14.

Figure 2:
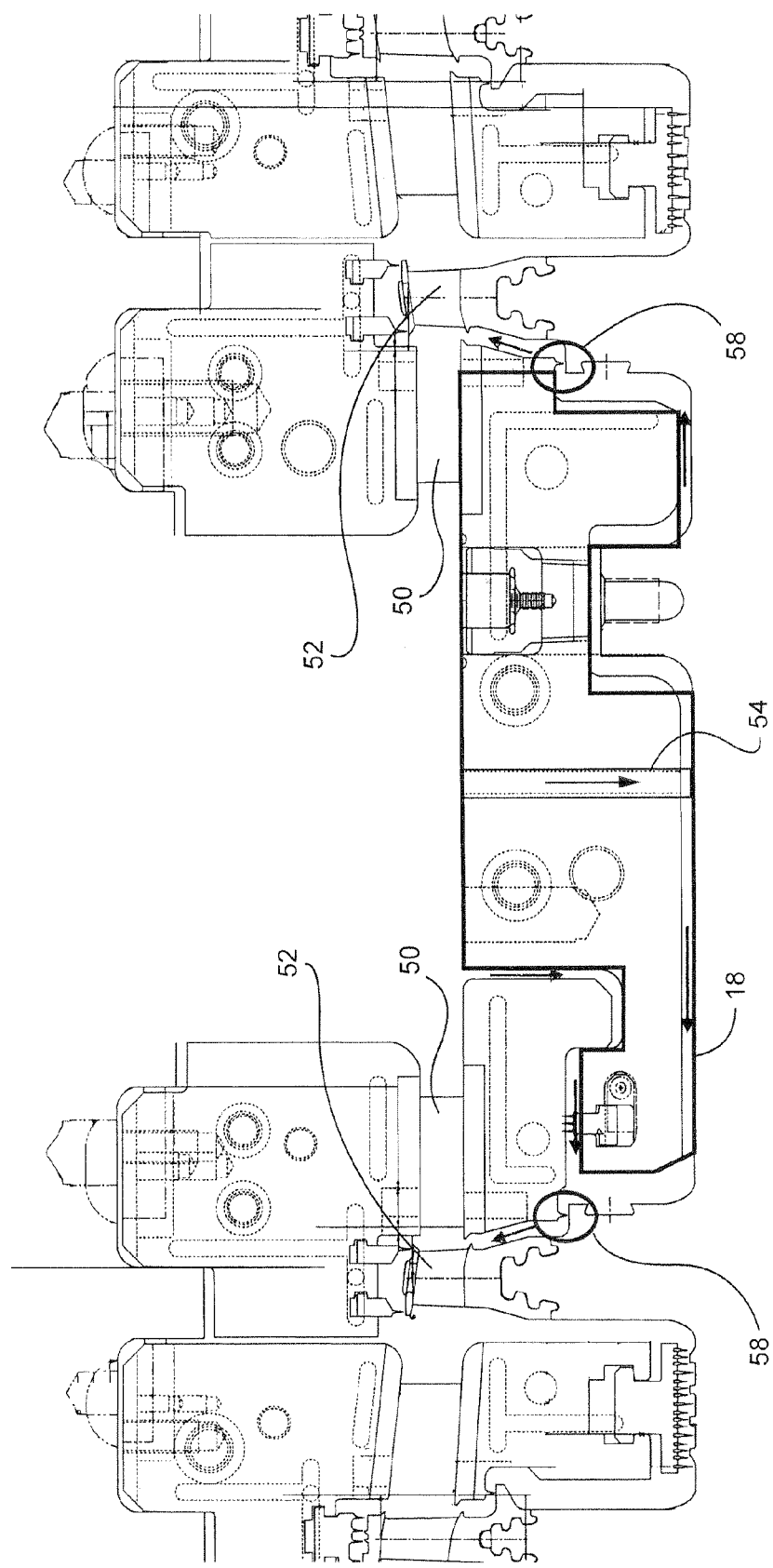
FIG. 2 is a more detailed illustration of a portion of the steam turbine schematically illustrated in FIG. 1.

FIG. 2 is a more detailed illustration of a portion of the steam turbine schematically illustrated in FIG. 1. In a prior art construction, the tub diaphragm 18 is used between the first stages to aid in guiding the steam flow through the turbine. The first stages of the double flow steam turbine include a plurality of first stage nozzles and first stage dovetail/bucket assemblies 52.

The region below the tub diaphragm 18 can be become stagnant with respect to steam flow and will heat up due to windage from the rotating shaft. The tub diaphragm 18 is thus provided with cooling holes 54 around the circumference of the tub diaphragm 18. In an exemplary embodiment, four cooling holes are provided, but it will be appreciated that more or fewer holes can be provided depending on the application and system design. The cooling holes 54 permit steam flow to pass below the tub diaphragm 18 to thereby effect positive cooling in that region.

The first stage wheel and blade dovetails 52 are cooled by the steam flow below the tub diaphragm 18.

The cooling circuit, including the cooling holes 54 in the tub diaphragm, also includes root radial seals 58 that allow a small amount of flow around the first stage nozzles 50 back into the steam path before the first stage buckets 52. As such, the first stage wheel and the blade dovetails are cooled without the steam bypassing the first stage blade.

The cooling circuit of the described embodiments helps to avoid component failure due to higher exposed temperatures.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A cooling path through a double-flow steam turbine, the steam turbine including a generator end and a turbine end and a double-flow tub diaphragm disposed axially between the generator end and the turbine end, a first stage of the steam turbine including a plurality of first stage nozzles and a plurality of first stage buckets, wherein a steam path is defined from an inlet region, through the turbine end, to a steam outlet, the cooling path comprising cooling holes in the tub diaphragm permitting steam flow beneath the tub diaphragm and around the first stage nozzles and back into the steam path before the first stage buckets, the cooling path further comprising root radial seals adjacent the first stage nozzles.

2. A cooling path according to claim 1, comprising four cooling holes in the tub diaphragm.

3. A cooling path according to claim 2, wherein the cooling holes are disposed around a circumference of the tub diaphragm.

4. A cooling path according to claim 1, wherein the cooling holes are disposed around a circumference of the tub diaphragm.

5. A steam turbine comprising:
a generator end;

a turbine end;

a double-flow tub diaphragm disposed axially between the generator end and the turbine end;

a first stage including a plurality of first stage nozzles and a plurality of first stage buckets;

a steam path defined from an inlet region, through the turbine end, to a steam outlet; and a cooling path including cooling holes in the tub diaphragm and root radial seals permitting steam flow around the first stage nozzles and back into the steam path before the first stage buckets.

6. A steam turbine according to claim 5, comprising four cooling holes in the tub diaphragm.

7. A steam turbine according to claim 6, wherein the cooling holes are disposed around a circumference of the tub diaphragm.

8. A steam turbine according to claim 5, wherein the cooling holes are disposed around a circumference of the tub diaphragm.

9. A method of cooling a double-flow steam turbine, the steam turbine including a generator end and a turbine end and a double-flow tub diaphragm disposed axially between the generator end and the turbine end, a first stage of the steam turbine including a plurality of first stage nozzles and a plurality of first stage buckets secured in respective blade dovetails, wherein a steam path is defined from an inlet region, through the turbine end, to a steam outlet, the method comprising directing steam flow below the tub diaphragm for positive cooling of the blade dovetails without bypassing the first stage buckets.

10. A method according to claim 9, wherein the directing step comprises:

diverting steam flow on the steam path through cooling holes in the tub diaphragm; and permitting the diverted steam flow to flow around the first stage nozzles and back into the steam path before the first stage buckets via root radial seals.

* * * * *